United States Patent Office 2,749,148
Patented June 5, 1956

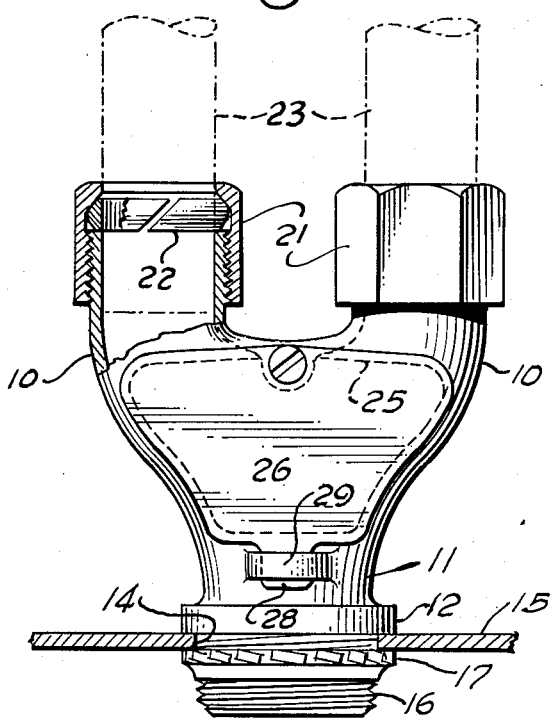
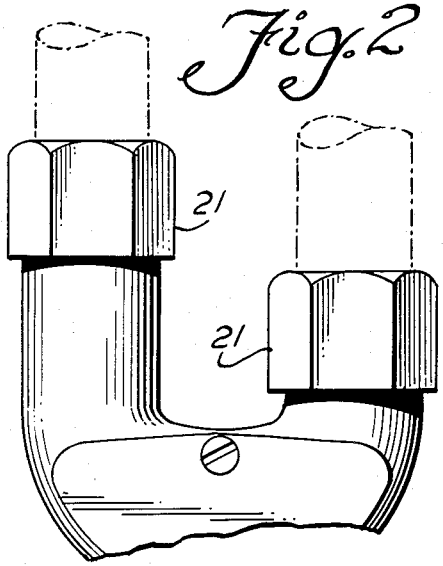
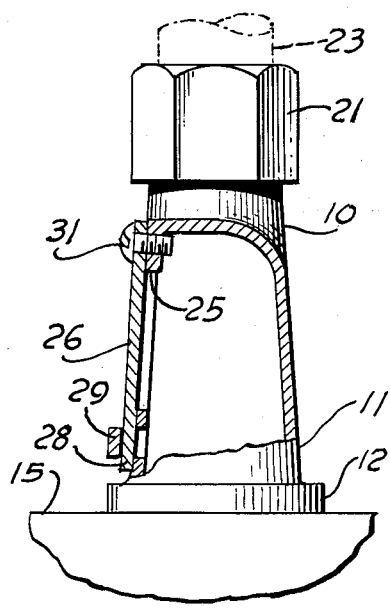
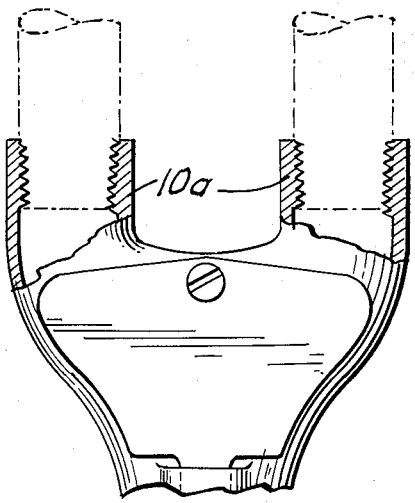

2,749,148

ELECTRICAL CONDUIT FITTING WITH ACCESS OPENING AND CLOSURE THEREFOR

Joseph Schneiderman, Chicago, Ill.

Application April 2, 1953, Serial No. 346,324

1 Claim. (Cl. 285—6.5)

This invention relates to fittings for use with conduit for receiving electrical conductors. Specifically it has reference to a "Siamese" fitting for effecting the connection of two or more conduits to a junction box, panel box or splice box where only one knockout opening is available.

So-called "duplex" connectors are available for attaching more than one flexible, sheathed electrical cable or conduit to a single knockout opening but, to the best of my knowledge a fitting for the analogous purpose of connecting so-called "thin wall" conduit or regular threaded conduit has been unavailable, even though the need therefor has been as pressing.

Thin wall conduit is available in various diameters and is distinguished from earlier conduit by having a substantially thinner wall, and which is incapable of receiving a sufficiently coarse thread. Accordingly thin wall conduit is coupled and connected by means of fittings which include a nut and compressible locking ring, as is well known.

However, no one heretofore has provided a fitting for connecting more than one section of thin wall conduit to a single knockout opening. It is therefore the object of my invention to provide a fitting for that purpose which is equipped with means for facilitating threading of the conductors of each of the sections of conduit into the single opening of the panel, or other, box.

In the drawing, which shows certain forms the invention may assume in practice:

Fig. 1 is a front elevation of a preferred form of connector for thin wall conduit;

Fig. 2 is a view similar to that of Fig. 1 of a modified form of the connector;

Fig. 3 shows a side view, partly sectioned, of the embodiment of Fig. 1; and,

Fig. 4 is a front elevation of a further alternative.

Generally regarded, the invention fitting, in one aspect, contemplates the provision of a "Siamese" fitting having a plurality of branches each for receiving a single section of conduit, and having means for securing the conduit in position, and all of the branches connecting commonly to a single trunk having means for connecting the fitting to a panel box or other enclosure to which the conductors are led. The fitting is further characterized by having an opening in one side wall for access to the conductors as they are "fished" through the fitting and for assembling and guiding the same into and out of the common trunk, and this opening is provided with a detachably securable cover of novel form to facilitate assembly thereof with the rest of the fitting. In another aspect the invention contemplates the provision of a fitting having branches of unequal lengths for allowing easier access to the conduit or the nuts.

Turning now to the drawing (Fig. 1) I have shown a fitting in accordance with the invention which comprises two (or more) branches 10—10 blending into a common trunk 11. This latter incorporates a flange 12 adapted to bear on the exterior margin of a knockout opening 14 in a wall 15 of a panel box, splice box, junction box or other compartment into which the conductors (not shown) are fed. A threaded neck 16 and locking type of nut 17 serve to secure the fitting to the wall 15 in the same fashion as similar fittings known to this art.

Each of the branches 10—10 is threaded to receive a nut 21 of such form as to compress a split ring 22, whereby upon tightening of the nut the ring is caused to clamp the conduit 23 in relation to the fitting.

At least one side face of the fitting is provided with an opening 25 over substantially the entire surface thereof for access to the interior of the fitting in order to facilitate drawing of the conductors through each of the branches, and their grouping and feeding through the trunk 11. Following use of the opening 25 the cover 26 may be replaced. Such cover overlaps the opening 25, as shown, and is retained on one side by the engagement of a tongue 28 thereof with a struck-out strap 29, and on the opposite side by a screw 31. Thus to detach or attach the cover only one screw need be removed, although when the cover is in place it is completely secure. It will be noted that the screw 31 is located in proximity to the saddle-like portion of the trunk 11 intermediate the branches 10—10 whereby to provide an unobstructed space within the cover 26 for manipulation of the conductors.

It will be comprehended that in nearly every case the fitting is juxtaposed to a wall surface, so that access to the nuts 21—21, due to their horizontal alignment, is somewhat limited in the intermediate space. Fig. 2 illustrates an alternative form of the invention arranged for better access to the nuts 21. In this case the nuts are staggered vertically to allow a greater clearance in the event it becomes necessary to manipulate the pliers or wrench into that space.

Fig. 4 shows another form of the invention disclosed in Fig. 1 except that the branches 10a—10a are threaded internally for receiving standard conduit.

While I have shown a particular embodiment of my invention, it will be understood, of course, that I do not wish to be limited thereto since many modifications may be made, and I therefore contemplate by the appended claim to cover any such modifications as fall within the true spirit and scope of my invention.

Having thus described my invention, what I claim and desire to secure by Letters Patent is:

A conduit fitting for thin wall electrical conduit comprising a tubular trunk having thread and nut means at one end for connection of the fitting to a junction box or the like and a plurality of tubular branches connected thereto and providing common communication therewith, the several axes of said trunk and branches being in a common plane, the unconnected terminations of said branches each being provided with nut and split ring locking means for receiving a conduit end and for clamping the same to the fitting, the zone of junction of said trunk and branches having an access opening on a face thereof substantially parallel to said plane for threading the conductors from a branch and through said trunk, a cover for said opening and screw means common to said zone and cover for detachably securing said cover over said opening, said screw means being positioned in close proximity to the saddle-like zone defined by the junction of the branches with the trunk.

References Cited in the file of this patent

UNITED STATES PATENTS

| | | |
|---|---|---|
| 1,295,304 | Grindle | Feb. 25, 1919 |
| 1,669,447 | Boynton | May 15, 1928 |
| 1,888,546 | Anderson | Nov. 22, 1932 |
| 2,064,140 | Appleton | Dec. 15, 1936 |
| 2,505,303 | Randa | Apr. 25, 1950 |